INVENTOR.
HOWARD L. PAULUS
BY
Willard S. Groen
ATTORNEY

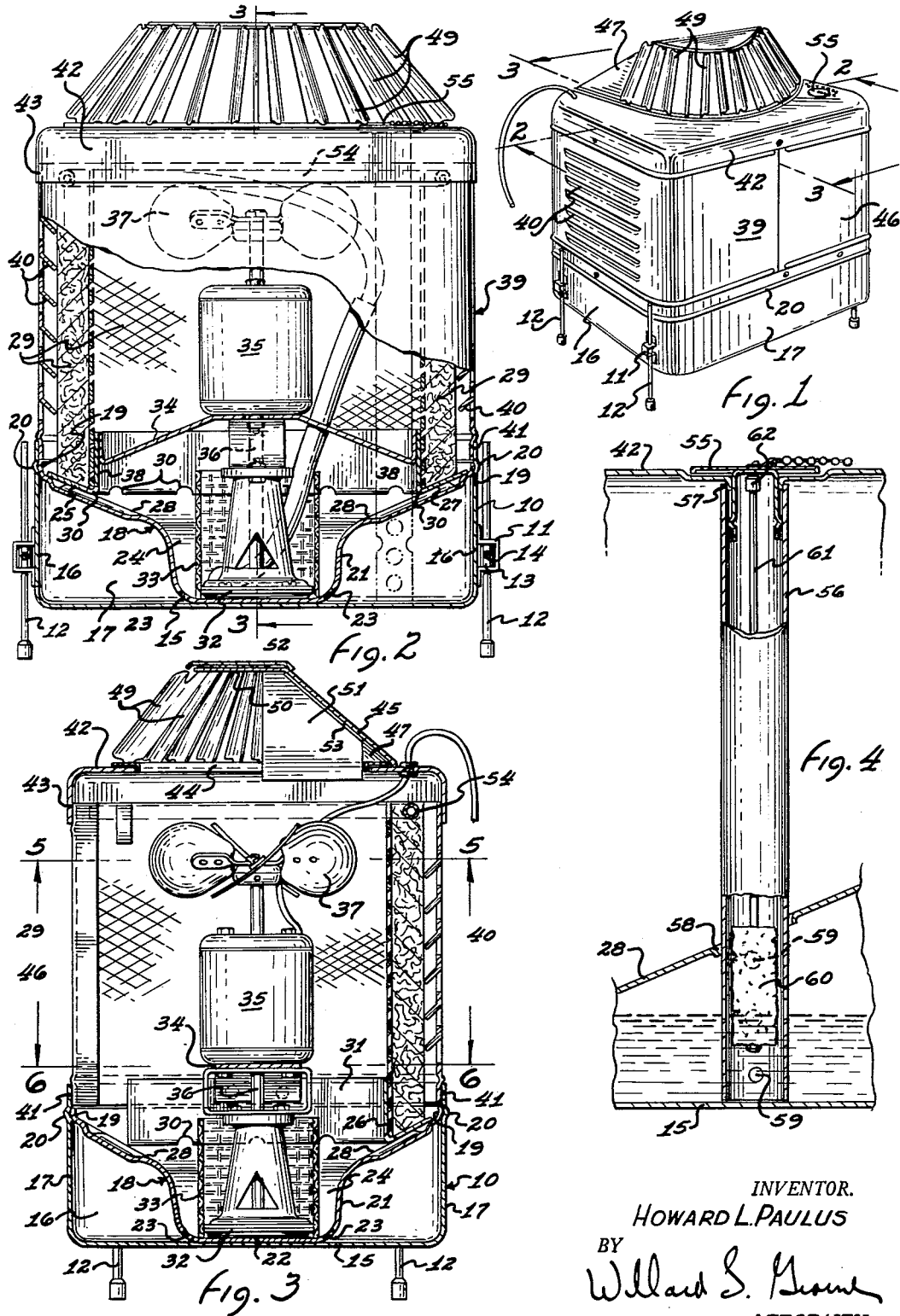
June 26, 1956 — H. L. PAULUS — 2,752,134
EVAPORATIVE AUTOMOBILE COOLER
Filed June 1, 1954 — 2 Sheets-Sheet 1
INVENTOR.
HOWARD L. PAULUS
BY
ATTORNEY June 26, 1956 H. L. PAULUS 2,752,134
EVAPORATIVE AUTOMOBILE COOLER Filed June 1, 1954 2 Sheets-Sheet 2

United States Patent Office 2,752,134
Patented June 26, 1956

2,752,134

EVAPORATIVE AUTOMOBILE COOLER

Howard L. Paulus, Phoenix, Ariz., assignor to Wright Manufacturing Co., Phoenix, Ariz., a corporation of Arizona Application June 1, 1954, Serial No. 433,672

5 Claims. (Cl. 261—29)

This invention pertains to improvements in evaporative automobile coolers and is particularly directed to an improved construction and operation for such units.

One of the objects of this invention is to provide an improved evaporative type cooler or air conditioner for automobiles which may be readily placed on the floor of the vehicle connected to the electric power supply from the battery of the motor vehicle.

Still another object of this invention is to provide an improved evaporative cooler having a specially constructed water reservoir which is splash-proof and easy to fill and maintain under all operating conditions of the vehicle.

Still another object of this invention is to provide an improved evaporative automobile cooler having a specially constructed discharge grille for the proper and adequate distribution of air in the passenger compartment of the vehicle.

Still another object of this invention is to provide an improved evaporative type automobile cooler which has a specially constructed frame work including a splash-proof reservoir and an efficient discharge grille arrangement in the body of the cooler.

Still another object of this invention is to provide an improved automobile cooler of the evaporative type having a vertically disposed drive motor with a water pump located below said motor in a depressed baffle portion in the lower water reservoir of the cooler and having an air circulating fan above said motor and below a specially constructed discharge grille for the adequate and efficient circulation of cooled air in the vehicle passenger compartment.

Further features and advantages of this invention will appear from a detailed description of the drawings in which:

Fig. 1 is a front perspective view of an evaporative automobile cooler incorporating the features of this invention.

Fig. 2 is a view partly in section on the line 2—2 of Fig. 1, showing a front elevation of the cooler.

Fig. 3 is a section on the line 3—3 of Figs. 1 and 2.

Fig. 4 is an enlarged fragmentary section of the filling tube and water level indicating mechanism shown by the line 4—4 in Figs. 5 and 6.

Figure 5:
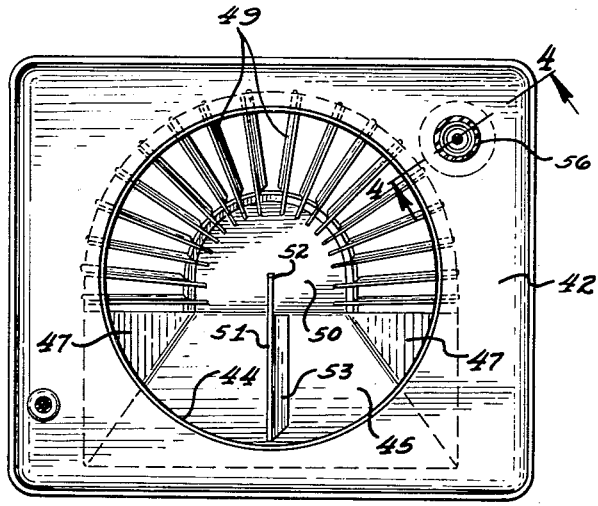
Fig. 5 is a view of the discharge grille apparatus indicated by the line 5—5 of Fig. 3.
Figure 6:
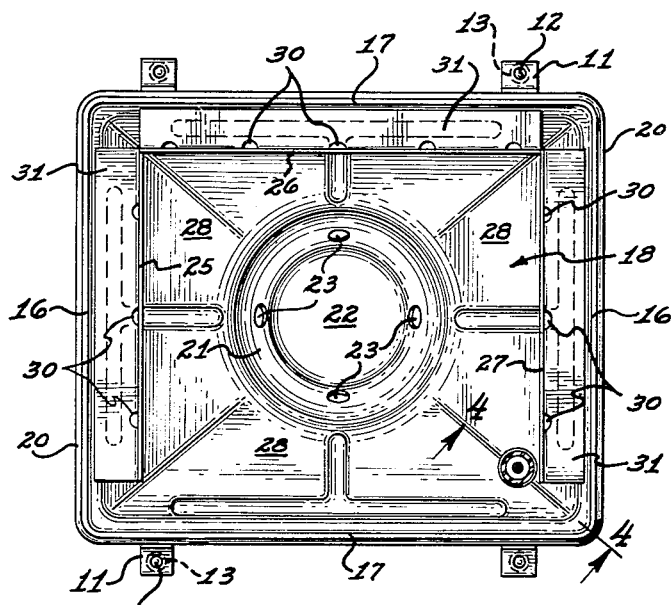
Fig. 6 is a plan view of the reservoir face indicated by the line 6—6 in Fig. 3.

As exemplary of one embodiment of this invention there is shown an evaporative automobile cooler having a base or reservoir pan 10 to which is secured the leg supporting clips 11 in which are adjustably mounted the support legs 12 which may be locked in desired vertical position by the clamp collars 13 and set screws 14 to properly position the unit on the motor vehicle floor, usually in front of the front seat of the vehicle over the hump in the floor formed by the transmission:

The base or reservoir pan has a bottom 15 and sides 16 and 17. The reservoir or base pan is provided with a splash control baffle consisting of an inner fabricated member 18 having a lip or flange 19 which presses into the inside portion of the upper part of the sides 16 and 17 and lock into a recessed bead 20 formed in the sides 16 and 17 so that once the member is pressed into the base 10 it automatically locks itself against being withdrawn upwardly and out of this base. The baffle 18 has a depressed center portion 21 as best shown in Fig. 6 having a bottom piece 22 preferably resting upon the bottom 15 of the reservoir pan 10 at the same instant that the flange or lip 19 locks into the recessed bead 20. Fluid flow holes 23 are formed near the bottom of the recessed center portion 21 so as to provide fluid communication between the reservoir pan 10 and the inner portion 24 of the splash control baffle 18.

The baffle 18 is also provided with a series of support flanges 25, 26 and 27 secured to the upper surface 28 of the baffle 18 so as to support the lower portion of the cooler pads 29. Discharge openings 30 are formed in the bottom portions 31 adjacent the flange portions 25, 26 and 27 of the bottom supports for the cooler pads which allow liquid draining from the cooler pads to flow freely down across the upper surface 28 of the baffle 18 into the depressed portion 21 of the baffle where the liquid returns immediately to the coolant pump 32 positioned in the recessed center portion 21. A suitable protective screen 33 may be placed around the intake of the pump 32 to prevent the inflow of foreign material or substances from the cooler pads. The pump 32 is mounted on a suitable support bracket 34 which also supports the main drive motor 35, the support 34 being secured to the flange portions 25 and 27 of the baffle member 18. The main drive motor has a suitable shaft 36 which connects downwardly to actuate the coolant pump 32 and connects upwardly with the main circulating fan 37, the entire assembly of the motor 35, the pump 32, and the fan 37 being carried on the support bracket 34 secured to the inner faces 38 of the flanges 25 and 27.

The cooler pads 29 are supported in a casing 39 which has louvers 40 on the three sides of the casing adjacent to the cooler pads 29 for the free inflow of air caused by suction from the fan 37 over these cooler pads. The casing 39 is arranged to also fit down inside of the upper portion of the base or reservoir pan as shown at 41. The upper portion of the casing 39 is enclosed by a cover 42 which slips down over the upper portion of the casing 39 as shown at 43. The cover 42 is provided with a circular opening 44 directly above and coincident with the fan 37. A baffle structure is provided above this opening consisting of a plate 45 sloping upwardly and forwardly with regard to the front panel 46 of the unit and the side plates 47 which slope upwardly and toward each other and engage the plate 45. The opening thus formed is provided with a semi-circular radially disposed arrangement of a series of discharge louvers 49, as best seen in Figs. 3 and 5, which likewise slope upwardly from the circular opening 44 and terminate in a top semi-circular piece 50. A support baffle 51 is vertically disposed in the unit and is connected at the center 52 of the semi-circular louver supporting piece 50 and extends rearwardly and is secured by suitable flange means 53 to the sloping plate 45. Suitable coolant distributing manifold means 54 is provided and is connected to the pump 32 so as to provide a constant supply of coolant water to percolate down over the cooler pad 29 in a well known manner.

Water is supplied to the reservoir by lifting the filler cap 55 which connects with the filler tube 56 supported at its upper end in a suitable opening 57 in the cover 42 and which filler tube 56 extends downwardly and is supported in an opening 58 formed in the sloping portion 28 of the baffle 18 and extends to the bottom 15 of the reservoir pan 10. Suitable perforations or openings 59 are formed in the filler tube 56 to allow ingress or egress of the water between the reservoir pan 10 and filler tube 56. Preferably a float indicator comprising the float piece 60 is secured to the indicator rod 61 having an indicating knob 62 which is normally enclosed and covered up by the filler cap 55 but when this cap is removed the float 60 then will assume a free floating position in the liquid level and indicate by the position of the knob 62 relative to the top 42 of the unit the amount of water remaining in the reservoir pan 10. Thus at any time the operator of the vehicle may quickly reach down and see the amount of water supply he has in the cooler and also can fill it accurately without overflowing by noting the relative position of the indicator knob.

It will be noted thus that a novel design has been provided for an automobile evaporative cooler in which the coolant is contained in the base 10 and is confined against splashing or sloshing about by the movement of the vehicle by the baffle 18 which has communicating holes 23 only at the very bottom of the depressed portion 21 thereof. It will be further noted that the coolant pump 32 sets in and displaces the water only in the recessed center bottom portion 21 of the baffle 18 and that the coolant water from the pads 29 is conveyed by the baffle upper surface into the recessed center portion surrounding the pump 32 and that the water from the coolant pads does not get directly into the basic supply contained in the base portion 10 of the cooler.

It will be further noted that with the coolant supply system above recited that the main drive motor drives the pump located in the depressed portion 21 by downwardly extending shaft and by the same shaft extending upwardly drives the air circulating blower fan 37. This fan is located coincident with a circular opening 44 in the top of the cooler above which is provided a novel semi-circular discharge louver system having the series of adjustable and directive louvers 49 together with the vertical baffle 51 to prevent rotary circulation of the air as initiated by the fan 37 so that a semi-circular flow discharge of desirable quality distribution and velocity is thus affected from the unit while at the same time the coolant is confined against splashing or getting into the air stream due to unusual violent movements of the motor vehicle in which it is mounted.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In an evaporative automobile cooler, a reservoir pan having upstanding sides, support legs mounted exteriorly on the sides of said pan, a splash control baffle fixed in said pan around the upper edges of said sides having a depressed center portion extending below the water line and to the bottom of said pan, said baffle having fluid flow holes formed around the bottom of said depressed center portion communicating with the reservoir portion of said pan, a casing mounted around the upper edge of the sides of said pan, a series of cooler pads inside of said casing, flange means on said baffle above the water line of said pan to support the bottom edges of said pads, intake louvers in said casing adjacent said pads, a main drive motor, a pump located above said baffle, a bracket carrying said motor and pump supported on said flange means, a fan located above and on the shaft of said motor and driven thereby, a cover mounted on the top of said casing, and discharge louver means in said cover for receiving and distributing discharge from said fan.

2. In an evaporative automobile cooler, a reservoir pan having upstanding sides, support legs mounted exteriorly on the sides of said pan, a splash control baffle fixed in said pan around the upper edges of said sides having a depressed center portion extending below the water line and to the bottom of said pan, said baffle having fluid flow holes formed around the bottom of said depressed center portion communicating with the reservoir portion of said pan, a casing mounted around the upper edge of the sides of said pan, a series of cooler pads inside of said casing, flange means on said baffle above the water line of said pan to support the bottom edges of said pads, intake louvers in three sides of said casing adjacent said pads, a main drive motor, a pump, a bracket carrying said motor and pump supported on said flange means, a fan located above and on the shaft of said motor and driven thereby, a cover mounted on the top of said casing, discharge louver means in said cover for receiving and distributing discharge from said fan, said discharge louver means including a central opening in said top coincident with the axis of rotation of said fan, an upwardly and forwardly sloping plate on the top above said opening, side plates on said top sloping convergingly toward each other and terminating in a semi-circular piece connected to said upwardly and forwardly sloping plate, and a semi-circularly arranged series of radially disposed air directing louvers between said central opening and said semi-circular piece located adjacent the fourth un-louvered side of said casing.

3. In an automobile cooler of the evaporative type, a reservoir pan having a bottom and integral sides, a splash control baffle comprising an inner fabricated member having a lip around its upper edge engaging with a press fit into the inside portion of the upper part of the sides of said reservoir pan, a recessed bead formed in said sides below the top edge thereof to provide a lock for said baffle when presented in said pan, a depressed center portion in said baffle having a bottom piece resting on the bottom of said pan below the water line thereof when said lip thereof locks into said bead, and fluid flow holes formed in said depressed center portion below said water line and adjacent the bottom thereof to provide fluid communication between the reservoir pan and the inner portion of said splash control baffle.

4. In an automobile cooler of the evaporative type, a reservoir pan having a bottom and integral sides, a splash control baffle comprising an inner member having a lip around its upper edge engaging with a press fit into the inside portion of the upper part of the sides of said reservoir pan, a recessed bead formed in said sides below the top edge thereof to provide a lock for said baffle when presented in said pan, a depressed center portion in said baffle having a bottom piece resting on the bottom of said pan below the water line thereof when said lip thereof locks into said bead, fluid flow holes formed in said depressed center portion adjacent the bottom thereof and below said water line to provide fluid communication between the reservoir pan and the inner depressed portion of said splash control baffle, a series of flanges on the top surface of said baffle around the edge thereof including means to support the bottom edges of cooler pads in said cooler and drain holes through said flanges below the bottom edges of said pads to conduct water from the bottom of said pads to said depressed center portion in said baffle.

5. In an automobile cooler of the evaporative type, a reservoir pan having a bottom and integral sides, a splash control baffle comprising an inner fabricated member having a lip around its upper edge engaging with a press fit into the inside portion of the upper part of the sides of said reservoir pan, a recessed bead formed in said sides below the top edge thereof to provide a lock for said baffle when presented in said pan, a depressed center portion in said baffle having a bottom piece resting on the bottom of said pan below the water line thereof when said lip thereof locks into said bead, fluid flow holes formed in said depressed center portion adjacent the bottom thereof and below said water line to provide fluid communication between the reservoir pan and the inner depressed portion of said splash control baffle, a coolant pump supported on said baffle located in said depressed center portion adjacent the bottom of said baffle, and motor drive means for actuating said pump.

References Cited in the file of this patent

UNITED STATES PATENTS

| | | |
|---|---|---|
| 2,237,497 | Munford | Apr. 8, 1941 |
| 2,525,157 | Trane | Oct. 10, 1950 |
| 2,557,276 | Gerow | June 19, 1951 |
| 2,600,926 | Rudd | June 17, 1952 |
| 2,608,396 | Shapiro | Aug. 26, 1952 |
| 2,626,136 | Krauss | Jan. 20, 1953 |